United States Patent [19]

Haddad, Jr.

[11] Patent Number: 5,179,991

[45] Date of Patent: Jan. 19, 1993

[54] RECEPTACLE COVER

[75] Inventor: Edward N. Haddad, Jr., Worcester, Mass.

[73] Assignee: Pioneer Consolidated Corporation, North Oxford, Mass.

[21] Appl. No.: 626,674

[22] Filed: Dec. 11, 1990

[51] Int. Cl.⁵ .......................... B60P 7/04; E06B 9/68
[52] U.S. Cl. ................................... 160/310; 160/265; 160/315; 296/98; 296/100
[58] Field of Search ............... 160/310, 311, 312, 265, 160/315; 296/100, 98; 4/502

[56] References Cited

U.S. PATENT DOCUMENTS

| 783,587 | 2/1905 | Nicewaner | 160/265 |
|---|---|---|---|
| 1,468,832 | 9/1923 | Parsons . | |
| 1,750,285 | 3/1930 | Schuler . | |
| 1,751,735 | 3/1930 | Hicinbothem | 160/265 |
| 1,827,059 | 10/1931 | Woolcott . | |
| 2,594,597 | 4/1952 | Taylor | 296/100 |
| 2,668,586 | 2/1954 | Luckie | 160/310 X |
| 3,041,104 | 6/1962 | Richard | 296/100 |
| 3,416,834 | 12/1968 | Morse, Jr. | 296/100 |
| 3,841,697 | 10/1974 | McFarland | 296/100 |
| 3,910,629 | 10/1975 | Woodard | 296/137 |
| 3,942,830 | 3/1976 | Woodard | 296/105 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,027,911 | 6/1977 | Johnson | 296/23 |
| 4,030,780 | 6/1977 | Petretti | 296/100 |
| 4,032,186 | 6/1977 | Pickering et al. | 296/100 |
| 4,046,416 | 9/1977 | Penner | 296/98 |
| 4,050,734 | 9/1977 | Richard | 296/98 |
| 4,095,840 | 6/1978 | Woodard | 296/100 |
| 4,157,202 | 6/1979 | Bachand | 296/100 |
| 4,189,178 | 2/1980 | Cramaro | 296/105 |
| 4,203,174 | 5/1980 | Shultz | 4/502 |
| 4,216,990 | 8/1980 | Musgrove et al. | 296/213 |
| 4,295,262 | 10/1981 | Grote et al. | 29/462 |
| 4,341,416 | 7/1982 | Richard | 296/98 |
| 4,469,317 | 9/1984 | Grote et al. | 269/69 |
| 4,494,707 | 1/1985 | Niibori et al. | 160/265 X |
| 4,516,802 | 5/1985 | Compton | 296/98 |
| 4,518,194 | 5/1985 | Kirkham et al. | 296/100 |
| 4,740,029 | 4/1988 | Tuerk | 296/100 |
| 4,874,196 | 10/1989 | Goldstein et al. | 296/98 |

FOREIGN PATENT DOCUMENTS 1060927 8/1979 Canada .................................. 296/98

Primary Examiner—Carl D. Friedman
Assistant Examiner—Derek J. Berger
Attorney, Agent, or Firm—Weingarten, Schurgin, Gagnebin & Hayes

[57] ABSTRACT

A covering apparatus, for a receptacle having an open top, including a cover having a first end and a second end and a length and width sufficient to cover the open top, a spring loaded roller, rotatably mounted at one end of the receptacle, and to which the first end of the cover is attached, the roller being adapted for retracting and winding the cover about the roller, a cable having a first end and a second end, the first end of the cable attached to said second end of the cover and adapted for unwinding said cover from the roller, a cable spool, rotatably mounted at one end of the receptacle and attached to which is the second end of the cable, the cable spool being adapted for spooling and unspooling the cable, and an energizing means for causing the cable spool to rotate. The apparatus has a first covered configuration in which the cover is unwound from the roller and extends over the top of the receptacle, and a second uncovered configuration in which the cover is wound about the spring loaded roller and the top of the receptacle is uncovered.

15 Claims, 6 Drawing Sheets

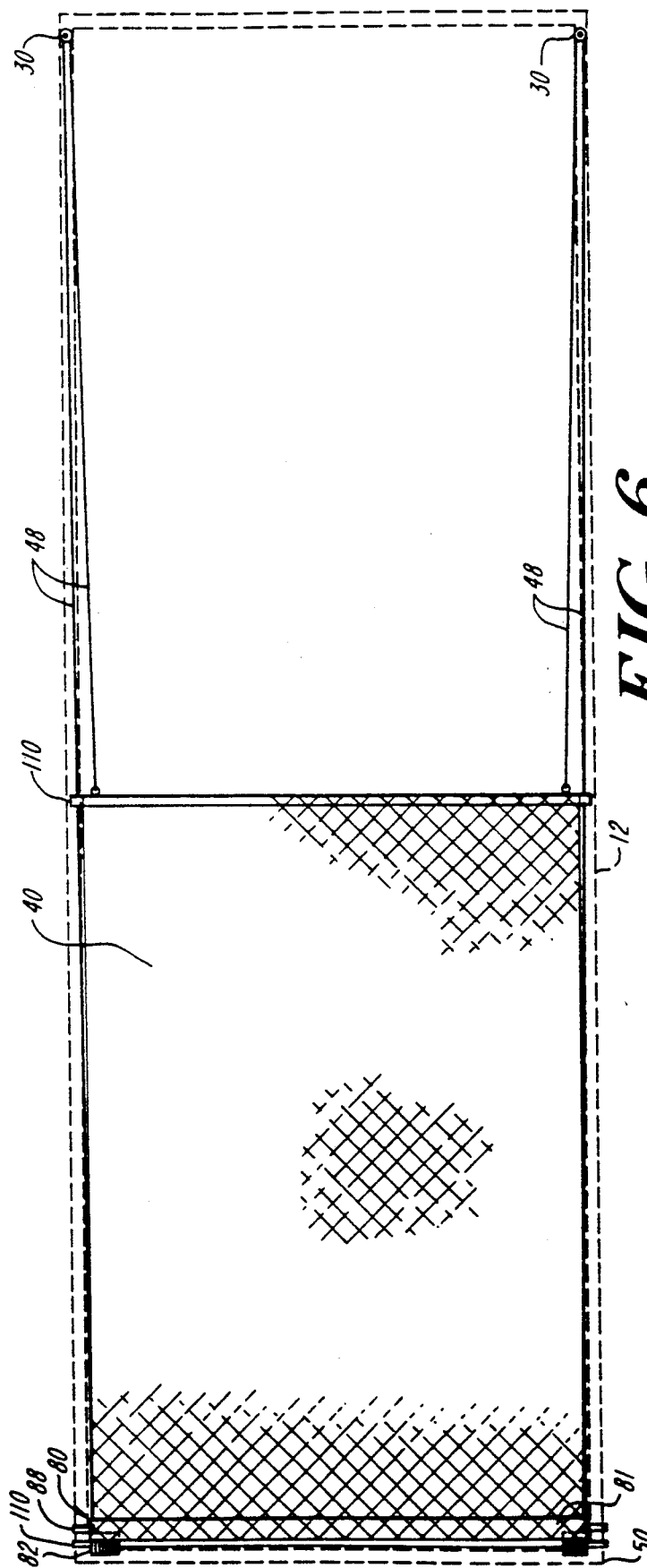

1

RECEPTACLE COVER

The invention relates to an apparatus for covering open top receptacles.

BACKGROUND OF THE INVENTION

Open top receptacles, such as open bed trailers, railroad cars or other containers, either while traveling or stationary, frequently must be covered, especially when loaded with loose material. The cover prevents the material within the container from being blown from the container either by the wind or by the airstream created when the container is moved. Further, many materials, such as dirt or grain, must be protected from the elements and a cover provides such protection.

Large open top receptacles are constructed with an open top for easy top loading. The requirements of a cover are fulfilled by providing a flexible removable cover, such as of canvas, which is secured over the top of the open top receptacle once the material to be contained has been loaded. Although a simple fabric sheet may be used as a cover, the problems of handling such a large piece of fabric material and of storing the cover when it is not positioned over the open top receptacle makes such a solution less than optimal. The present invention relates to a retractable cover apparatus in which the cover retracts into a housing located at the front of the receptacle when not in use.

SUMMARY OF THE INVENTION

The invention relates to a covering apparatus for a receptacle having an open top. The apparatus in one embodiment features a cover having a length and width sufficient to cover the open top. A spring loaded roller is rotatably mounted at one end of the receptacle and attached to that roller is a first end of the cover. The roller is adapted for retracting and winding the cover about the roller. The first end of a cable is attached to the second end of the cover and is adapted for unwinding the cover from the roller. A cable spool is rotatably mounted at one end of the receptacle and adapted for spooling and unspooling the cable. An energizing means causes the cable spools to rotate in one direction so as to spool the cable and to rotate in the other direction so as to unspool the cable. The apparatus has a first covered configuration in which the cover is unwound from the roller and extends over the top of the receptacle and a second uncovered configuration in which the cover is wound about the spring loaded roller and the top of the receptacle is uncovered.

In another embodiment, the covering apparatus for a receptacle having an open top includes a flexible cover having a length and width sufficient to cover the open top. A spring loaded roller is rotatably mounted at the front end of the receptacle. The first end of the cover is attached to the roller. The roller is adapted for retracting and winding the cover about the roller. The first end of each of a pair of cables are attached to the second end of the cover. The cables are adapted for unwinding the cover from the spring loaded roller. One pulley of a pair of pulleys is each located at a respective top rear corner of the receptacle. One of the cables passes through one of the pulleys and the other one of the cables passes through the other one of the pulleys. A pair of cable spools is rotatably mounted, one near each respective top front corner of the receptacle. Each of the cable spools is adapted for spooling and unspooling one of the pair of cables after the cable has passed through the pulley. An energizing means causes the cable spools to rotate in one direction so as to spool the cable and to rotate in the other direction so as to unspool the cable. The apparatus has a first covered configuration in which the cover extends over the top of the receptacle, and a second uncovered configuration in which the cover is wound about the spring loaded roller and the top of the receptacle is uncovered.

BRIEF DESCRIPTION OF THE DRAWINGS

These and other features of the invention are more fully set forth in the detailed description and drawing of which:

FIG. 6 is a top view of the embodiment of the invention shown in FIG. 2.

DESCRIPTION OF THE PREFERRED EMBODIMENT

Figure 1:
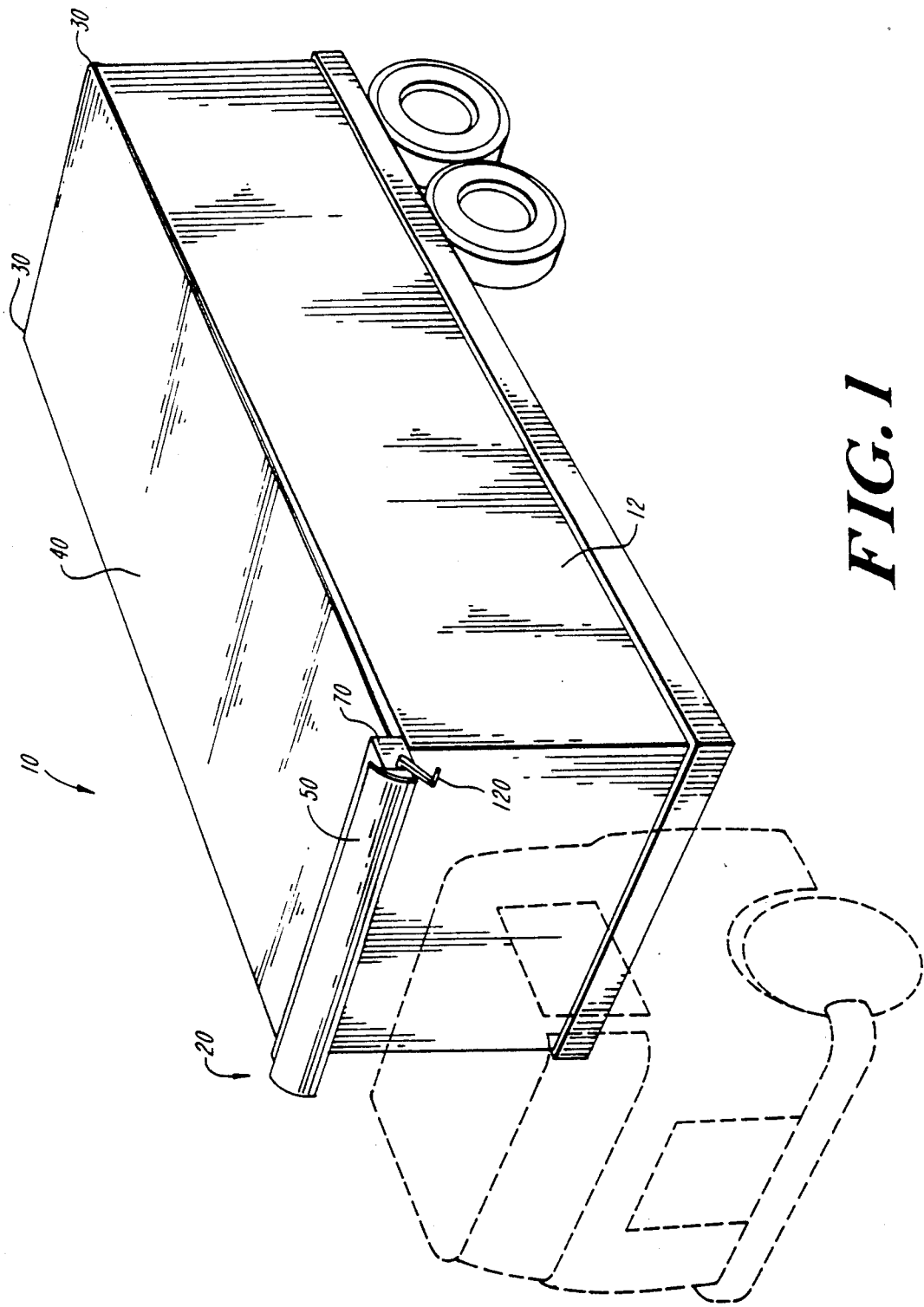
FIG. 1 is a perspective view of an embodiment of the invention located on the open top receptacle in the covered configuration.
Figure 1A:
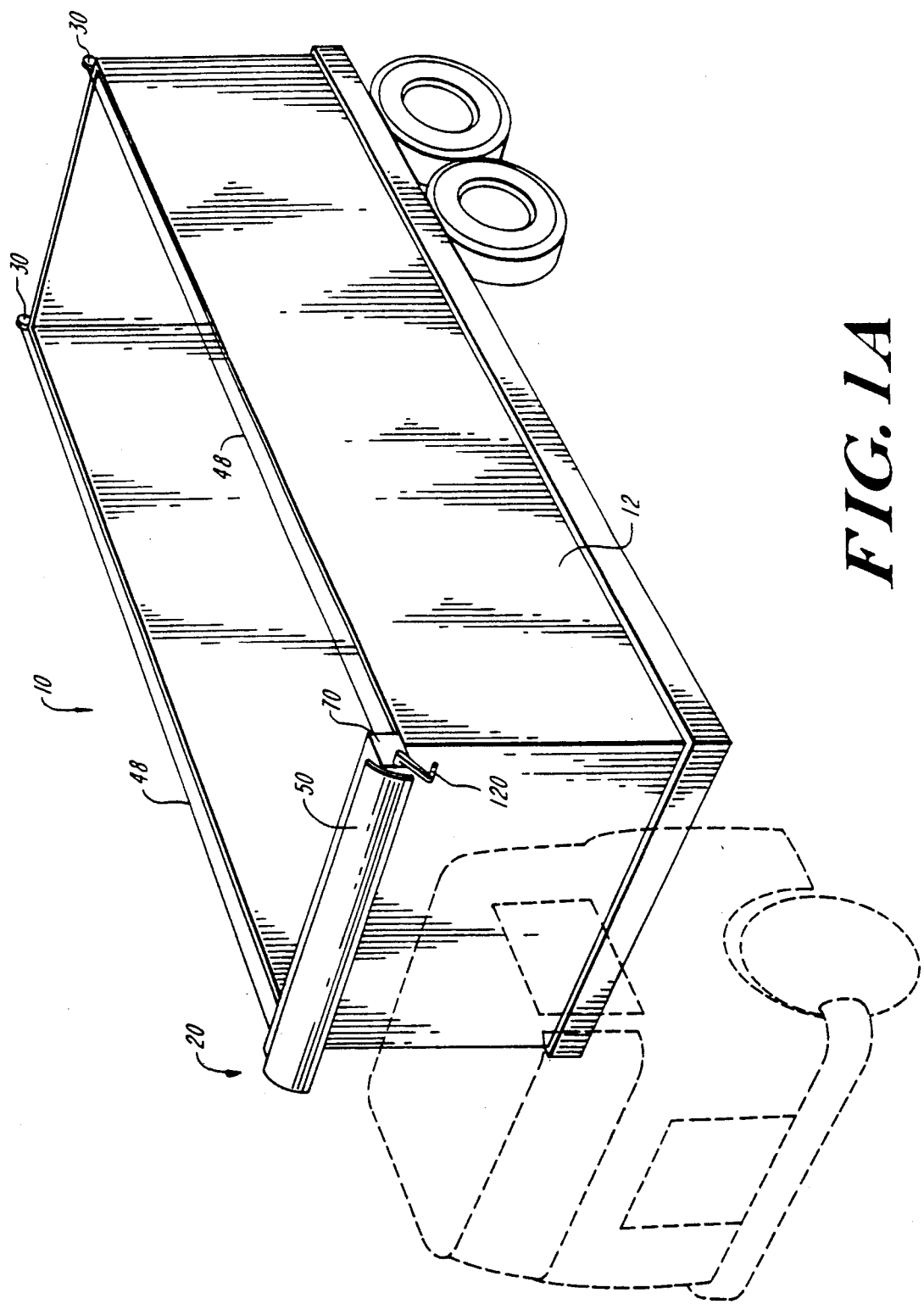
FIG. 1a a perspective view of the embodiment of FIG. 1 located on the open top receptacle in the uncovered configuration.
Figure 2:
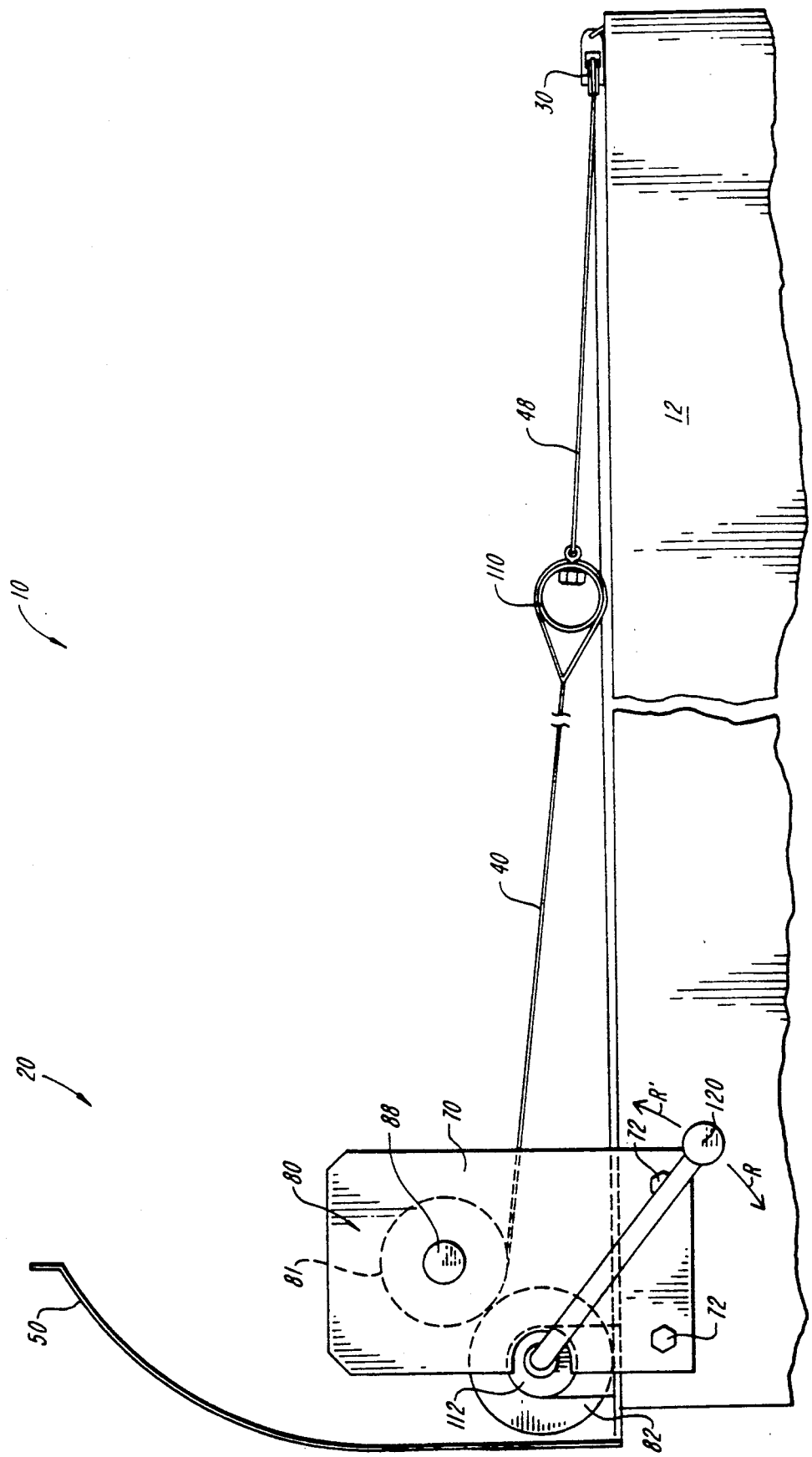
FIG. 2 is a side view of the embodiment of FIG. 1 in a half covered configuration.

In brief overview, referring to FIGS. 1, 1a and 2, an embodiment of the receptacle cover apparatus 10 located on an open top receptacle 12, which only by way of an example is shown as an open bed trailer, includes a front portion 20, a pair of rear pulleys 30, a cover 40 and a pair of cables 48, one of which is located along each side of the receptacle 12. In the covered configuration (FIG. 1), the cover 40 is pulled by means of cables 48 from its storage area in the front portion 20, over the receptacle top 12 and up to the rear pulleys 30. To store the cover 40, tension on the cables 48 is released and the cover 40 is pulled back into its storage area in the front portion 20 of the apparatus 10 (FIG. 1a).

Considering the front portion in more detail, and referring especially to FIG. 2, the front portion 20 is located along and attached to the top front edge of the open top receptacle 12 by means of a pair of mounting brackets 70, one of which is attached to each side of the receptacle 12 by bolts 72. Attached to the brackets 70 is a windscreen 50, positioned such that the windscreen 50 extends above the top front edge of the receptacle 12. Located between the brackets 70 is a spring loaded top roller 80 and a pair of cable spools 82.

The spring loaded top roller 80 in the front portion 20 12 is the storage area for the cover 40. The spring loaded top roller 80 includes a roller 81 which is rotatably mounted to an axle 88, each end of the axle 88 is fixedly attached to one of the brackets 70 attached at each side of the receptacle 12. The spring loaded top roller 80, to which is attached one end of the cover 40, is constructed in the same manner as a retractable window shade. That is, the cover 40 is rolled about the spring loaded top roller 80 during storage and is unrolled from the spring loaded top roller 80 for use.

Figure 3:
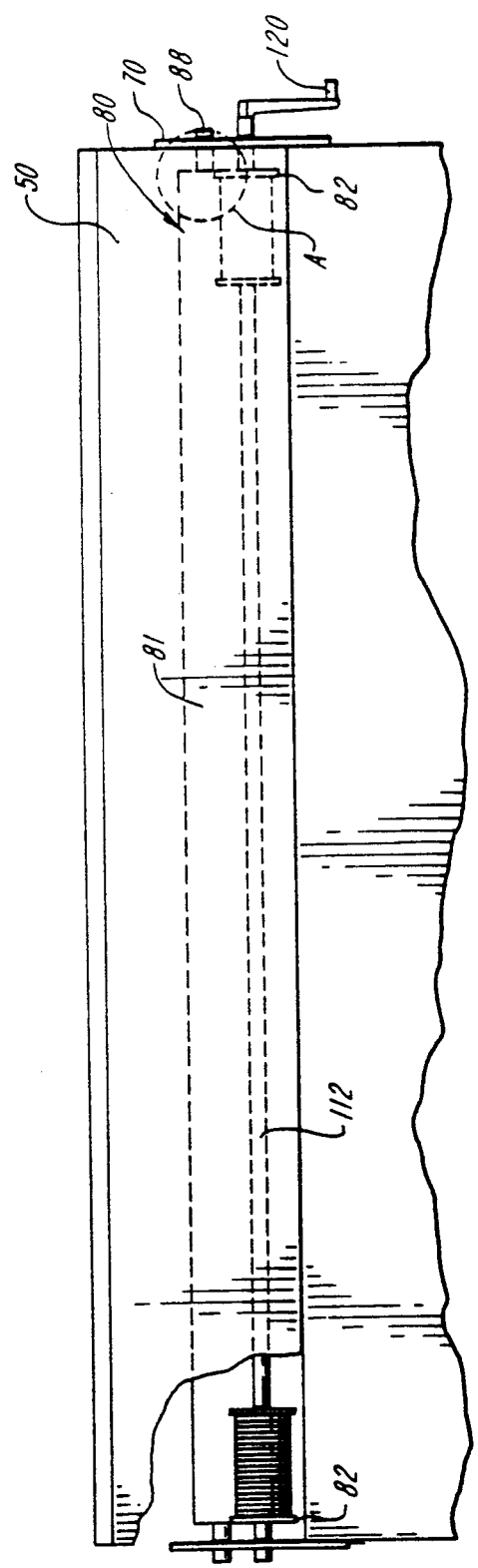
FIG. 3 is a front view of the embodiment of the invention shown in FIG. 1.
Figure 4:
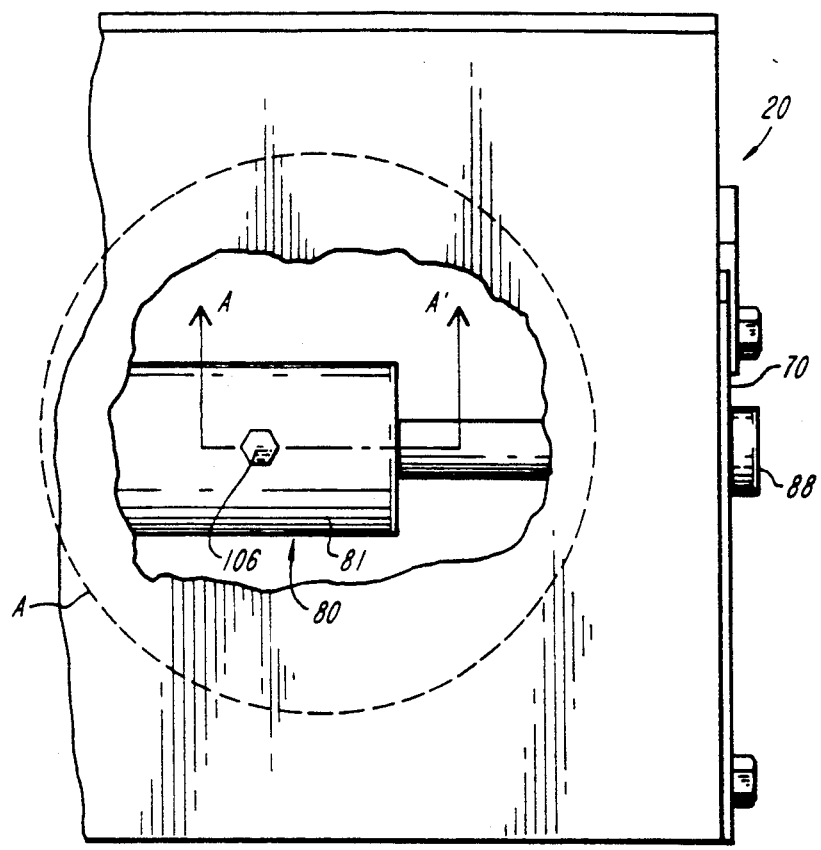
FIG. 4 is an expanded view of region A in FIG. 3.
Figure 5:
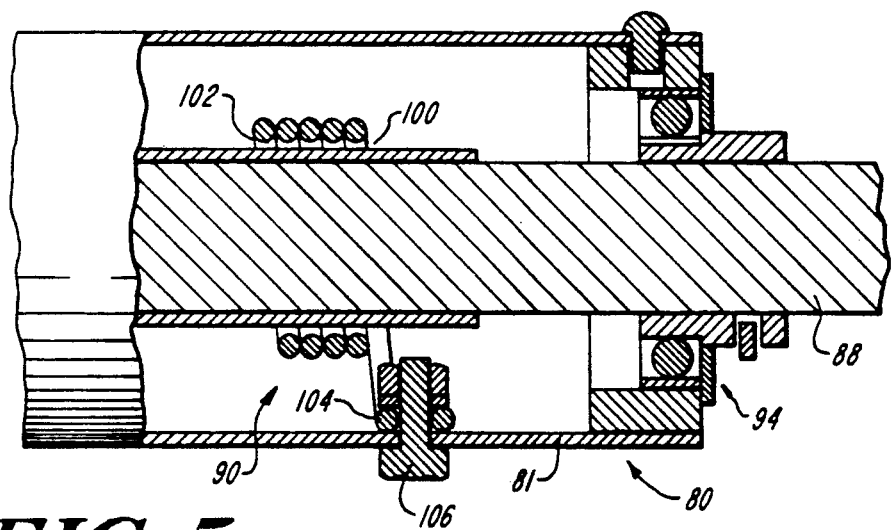
FIG. 5 is a cross-sectional view through section A—A' of FIG. 4.

Referring also to FIGS. 3, 4 and 5, as the cover 40 is unrolled, the roller 81 of the spring loaded top roller 80 rotates causing the internal spring assembly 90 (FIG. 5)

to tighten. The tightening of the spring assembly 90 biases the roller 81 to rotate in the direction opposite from that in which the cover 40 is unrolled. Therefore, as the cover 40 is pulled and unrolled from the spring loaded top roller 80 by rotation of the roller 81, the spring assembly 90 is tightened and when the cover 40 is released, the stored tension in the spring assembly 90 of the spring loaded top roller 80 causes the roller 81 to rotate in the opposite direction from which the cover 40 was unrolled, thereby causing cover 40 to be wound about the spring loaded top roller 80 for storage.

Considering the spring assembly 90 in detail, and referring to FIG. 5, which depicts section A—A' in FIG. 4, roller 81 is coaxially mounted on the axle 88 by way of a pair of ball bearing assemblies 94 attached to each end of the roller 81. In this way, the roller 81 is free to rotate about the axle 88. Coaxially mounted about axle 88 is a coil spring 100. One end 102 of the coil spring 100 is fixedly attached to axle 88. The other end 104 of the coil spring 100 is fixedly attached to the roller 81 by means of a bolt 106. As the roller 81 of the spring loaded top roller 80 rotates to permit the cover 40 to be extended, the coil spring 100 is torsioned about axle 88 and serves to bias the roller 81 to rotate in the opposite direction, that is, to retract the cover 40.

Referring also to FIG. 6, the end of the cover 40 which is not attached to the spring loaded top roller 80 is fastened about a tube 110. By pulling on tube 110, the cover 40 is unrolled from the spring loaded top roller 80. Tube 110 is pulled to the rear of the receptacle top 12 by a pair of cables 48 attached near each end of tube 110. Each cable 48 extends to the rear of the open top receptacle 12 and passes through a respective pulley 30. The cables 48 thereby reverse direction and extend toward the front of the receptacle 12.

Referring again to FIG. 3, the end of each cable 48 which does not attach to the tube 110 is attached to a respective cable spool 82. Each cable spool 82 is fixedly attached to a spool axle 112. The spool axle 112 in turn is rotatably mounted to the brackets 70. A handcrank 120 is attached to one end of axle 112 which projects through bracket 70. As the handcrank 120 is turned (arrow R, FIG. 2), axle 112 rotates, causing cable spools 82 to rotate and cable 48 to be taken up or spooled on its respective cable spool 82. As the cables 48 are taken up on cable spools 82, the tube 110 is pulled toward the rear of the open top receptacle 12 and the cover 40 is unrolled from the spring loaded top roller 80. As the spring loaded top roller 80 rotates, the spring assembly 90 tightens. When the cover 40 reaches the end of the open top receptacle 12, the material within the top is covered. The handcrank 120 may be locked in the final position or any intermediate position of the cover 40 using any number of locking means known to the art.

When the crank 120 is turned in the other direction (arrow R', FIG. 2), the cables 48 are played out from the cable spools 82 and the spring assembly 90 then causes the roller 81 to rotate in the direction opposite from the direction of rotation caused by the unrolling of the cover 40, the cover 40 is rolled back upon the spring loaded top roller 80 and the top is uncovered. Other embodiments are possible in which the handcrank 120 is replaced by an electric motor, pneumatic or hydraulic mechanism to rotate the spool axle 112.

Other embodiments are possible which will still be within the spirit and scope of the claims and it is intended to limit the invention only by the scope of the claims.

What is claimed is:

1. A covering apparatus for a receptacle having an open top comprising:
   a cover having a first end, a second end, and two sides, said cover being of a length and width sufficient to cover no more than said open top;
   a spring loaded roller, rotatably mounted at one end of the receptacle, and to which said first end of said cover is attached, said roller adapted for retracting and winding said cover about said roller;
   a cable having a first end, a second end, and a length disposed between said first and second ends, said length being exposed and free when said cable is unspooled, the first end of said cable being attached to said second end of said cover, said cable being for unwinding said cover from said roller; and
   a cable spool, rotatably mounted at one end of the receptacle and attached to which is the second end of said cable, for spooling and unspooling said cable,
   energizing means for causing said cable spool to rotate in one direction so as to spool said cable and to rotate in the other direction so as to unspool said cable,
   said apparatus having a covered configuration in which said cover is unwound from said roller and extends substantially over only the opening of the receptacle, said cover being secured only at said first and second ends, and an uncovered configuration in which said cover is wound about said spring loaded roller and said top of said receptacle is uncovered.

2. The apparatus of claim 1 wherein said energizing means is a crank handle attached to said cable spool and adapted to cause said cable spool to rotate in one direction so as to spool said cable and to rotate in the opposite direction so as to unspool said cable.

3. The apparatus of claim 1 wherein said energizing means is an electric motor attached to said cable spool and adapted to cause said cable spool to rotate in one direction so as to spool said cable and to rotate in the opposite direction so as to unspool said cable.

4. The apparatus of claim 1 wherein said energizing means is an hydraulic activator attached to said cable spool and adapted to cause said cable spool to rotate in one direction so as to spool said cable and to rotate in the opposite direction so as to unspool said cable.

5. The apparatus of claim 1 wherein said energizing means is a pneumatic activator attached to said cable spool and adapted to cause said cable spool to rotate in one direction so as to spool said cable and to rotate in the opposite direction so as to unspool said cable.

6. The apparatus of claim 1 wherein said spring loaded roller is spring biased to cause said roller to rotate and thereby cause said cover to wind about said roller.

7. The apparatus of claim 1 wherein said spring loaded roller is located at the front end of the receptacle.

8. The apparatus of claim 7 wherein said cable spool is located at the front end of said receptacle.

9. The apparatus of claim 8 further comprising a pulley located at the rear end of said receptacle and through which said cable passes from said cover to said cable spool.

10. The apparatus of claim 1 further comprising an airshield positioned so as to deflect the movement of air from said spring loaded roller.

11. A covering apparatus for a receptacle having an open top comprising:
- a flexible cover having a first end, a second end, and two sides, said cover being of a length and width sufficient to cover more than said open top;
- a spring loader roller, rotatably mounted at the front end of the receptacle, and to which said first end to said cover is attached, said roller adapted for retracting said winding said cover about said roller;
- a pair of cables, each said cable having a first end, a second end, and a length disposed between said first and second ends, said length being exposed and free when said cable is unspooled, the first end of each said cable being attached to said second end of said cover, each said cable being for unwinding said cover from said spring loaded roller;
- a pair of pulleys, one of each located at a respective top rear corner of said receptacle, one of said cables passing through one of said pulleys, the other one of said cables passing through the other one of said pulleys;
- a pair of cable spools, one of each of said cable spools rotatably mounted near each respective top front corner of the receptacle and attached to each respective said cable spool is the second end of said respective cable, each of said cable spools adapted for spooling and unspooling one of said pair of cables after said cable has passed through said pulley, and
- an energizing means for causing said cable spools to rotate in one direction so as to spool said cable and to rotate in the other direction so as to unspool said cable,
- said apparatus having a covered configuration in which said cover extends substantially over only the opening of the receptacle, said cover being secured only at said first and second ends, and an uncovered configuration in which said cover is wound about said spring loaded roller and said top of said receptacle is uncovered.

12. The apparatus of claim 11 wherein said energizing means is a crank handle attached to said cable spool and adapted to cause said cable spool to rotate in one direction so as to spool said cable and to rotate in the opposite direction so as to unspool said cable.

13. The apparatus of claim 11 wherein said energizing means is an electric motor attached to said cable spool and adapted to cause said cable spool to rotate in one direction so as to spool said cable and to rotate in the opposite direction so as to unspool said cable.

14. The apparatus of claim 11 wherein said energizing means is an hydraulic activator attached to said cable spool and adapted to cause said cable spool to rotate in one direction so as to spool said cable and to rotate in the opposite direction so as to unspool said cable.

15. The apparatus of claim 11 wherein said energizing means is a pneumatic activator attached to said cable spool and adapted to cause said cable spool to rotate in one direction so as to spool said cable and to rotate in the opposite direction so as to unspool said cable.

* * * * *

UNITED STATES PATENT AND TRADEMARK OFFICE
CERTIFICATE OF CORRECTION

PATENT NO. : 5,179,991
DATED : January 19, 1993
INVENTOR(S) : Edward N. Haddad, Jr.

It is certified that error appears in the above-indentified patent and that said Letters Patent is hereby corrected as shown below:

```
Column 2, line 56, "12 is the" should read --is the--.
```

Signed and Sealed this

Third Day of May, 1994

*Attest:*

BRUCE LEHMAN

*Attesting Officer*   *Commissioner of Patents and Trademarks*